(12) United States Patent
Kao

(10) Patent No.: US 10,739,008 B2
(45) Date of Patent: Aug. 11, 2020

(54) ROASTING DEVICE

(71) Applicant: Yi-Feng Kao, Taipei (TW)

(72) Inventor: Yi-Feng Kao, Taipei (TW)

( * ) Notice: Subject to any disclaimer, the term of this patent is extended or adjusted under 35 U.S.C. 154(b) by 171 days.

(21) Appl. No.: 15/818,964

(22) Filed: Nov. 21, 2017

(65) Prior Publication Data

US 2019/0086094 A1 Mar. 21, 2019

(30) Foreign Application Priority Data

Sep. 18, 2017 (TW) .............................. 106131977 A

(51) Int. Cl.
| | |
|---|---|
| *F24B 1/02* | (2006.01) |
| *A47J 37/07* | (2006.01) |
| *A47J 37/06* | (2006.01) |
| *F24B 1/195* | (2006.01) |
| *F24B 1/20* | (2006.01) |
| *F24B 1/22* | (2006.01) |
| *F24B 1/26* | (2006.01) |
| *F24B 3/00* | (2006.01) |

(52) U.S. Cl.
CPC ........... *F24B 1/022* (2013.01); *A47J 37/0623* (2013.01); *A47J 37/07* (2013.01); *A47J 37/0763* (2013.01); *F24B 1/195* (2013.01); *F24B 1/205* (2013.01); *F24B 1/22* (2013.01); *F24B 1/26* (2013.01); *A47J 37/0718* (2013.01); *A47J 2037/0777* (2013.01); *F24B 3/00* (2013.01)

(58) Field of Classification Search
CPC .... F24B 1/022; F24B 1/22; F24B 1/26; F24B 1/205; F24B 1/195; F24B 3/00; A47J 37/07; A47J 2037/0777; A47J 37/0718; A47J 37/0763; A47J 37/0623
USPC .................................................. 126/9 B, 9 R
See application file for complete search history.

(56) References Cited

U.S. PATENT DOCUMENTS

| | | | | | |
|---|---|---|---|---|---|
| 3,359,963 | A | * | 12/1967 | Kostial ............... | A47J 37/0704 126/9 R |
| 3,791,370 | A | * | 2/1974 | Fauser ................ | A47J 37/0704 126/25 A |
| 4,726,349 | A | * | 2/1988 | Gehrke ............... | A47J 37/0763 126/145 |
| 5,713,344 | A | * | 2/1998 | Gilbert ................ | A47J 37/0772 126/25 R |
| 2018/0125083 | A1 | * | 5/2018 | Carter ....................... | A23L 5/17 |

* cited by examiner

*Primary Examiner* — Steven B McAllister
*Assistant Examiner* — Benjamin W Johnson
(74) *Attorney, Agent, or Firm* — Bacon & Thomas, PLLC

(57) ABSTRACT

A roasting device has an upright plate unit, a brazier unit and a support unit. The upright plate unit includes a main plate, a first side plate, a second side plate, and a base plate. The main plate has two inner edges. The first side plate is pivotally connected to one of the two inner edges of the main plate. The second side plate is pivotally connected to the other inner edge of the main plate. The base plate is mounted between the first side plate and the second side plate, and abuts the first side plate and the second side plate. The brazier unit is located in the upright plate unit. The support unit is mounted in the upright plate unit and above the brazier unit.

18 Claims, 7 Drawing Sheets

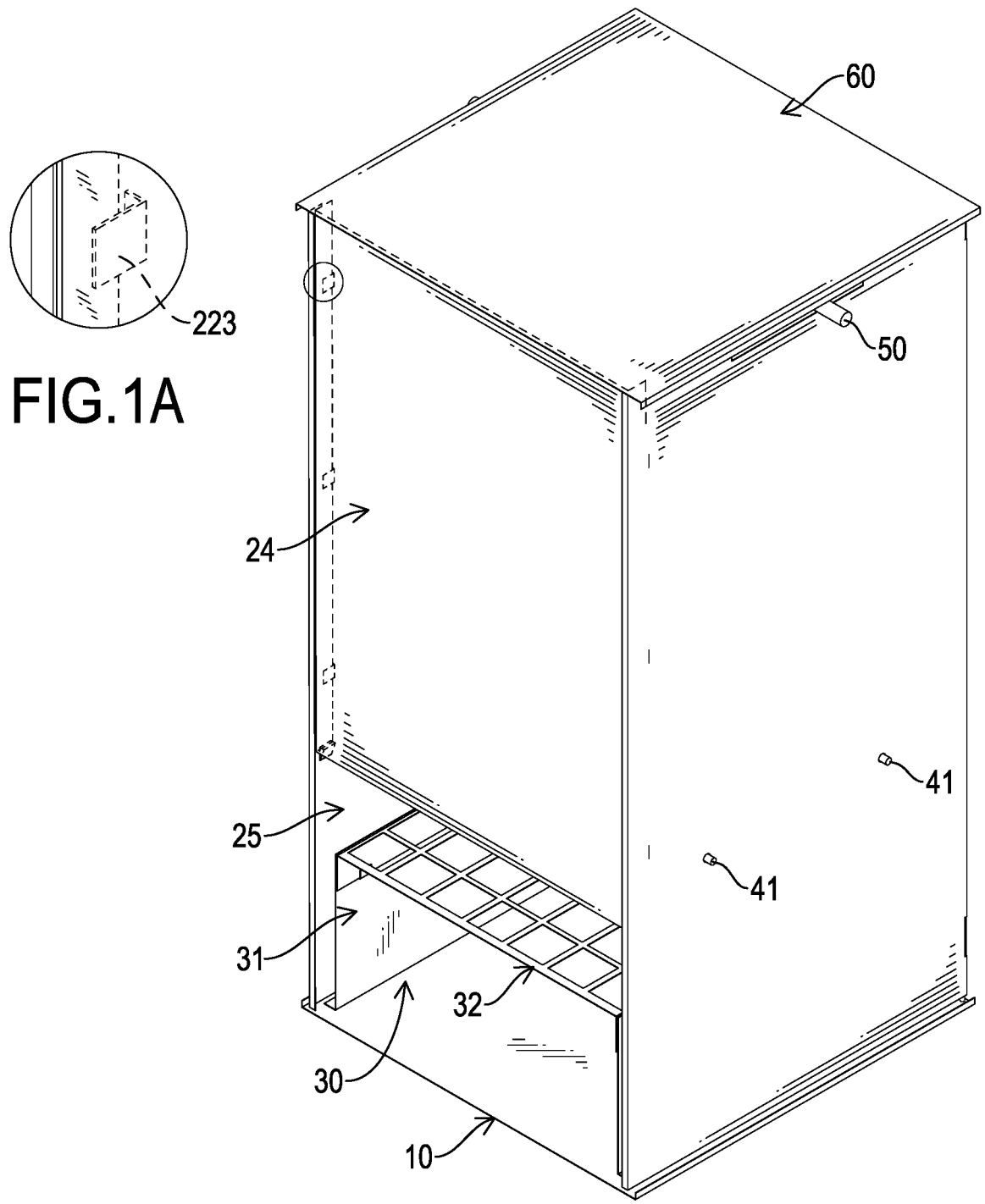

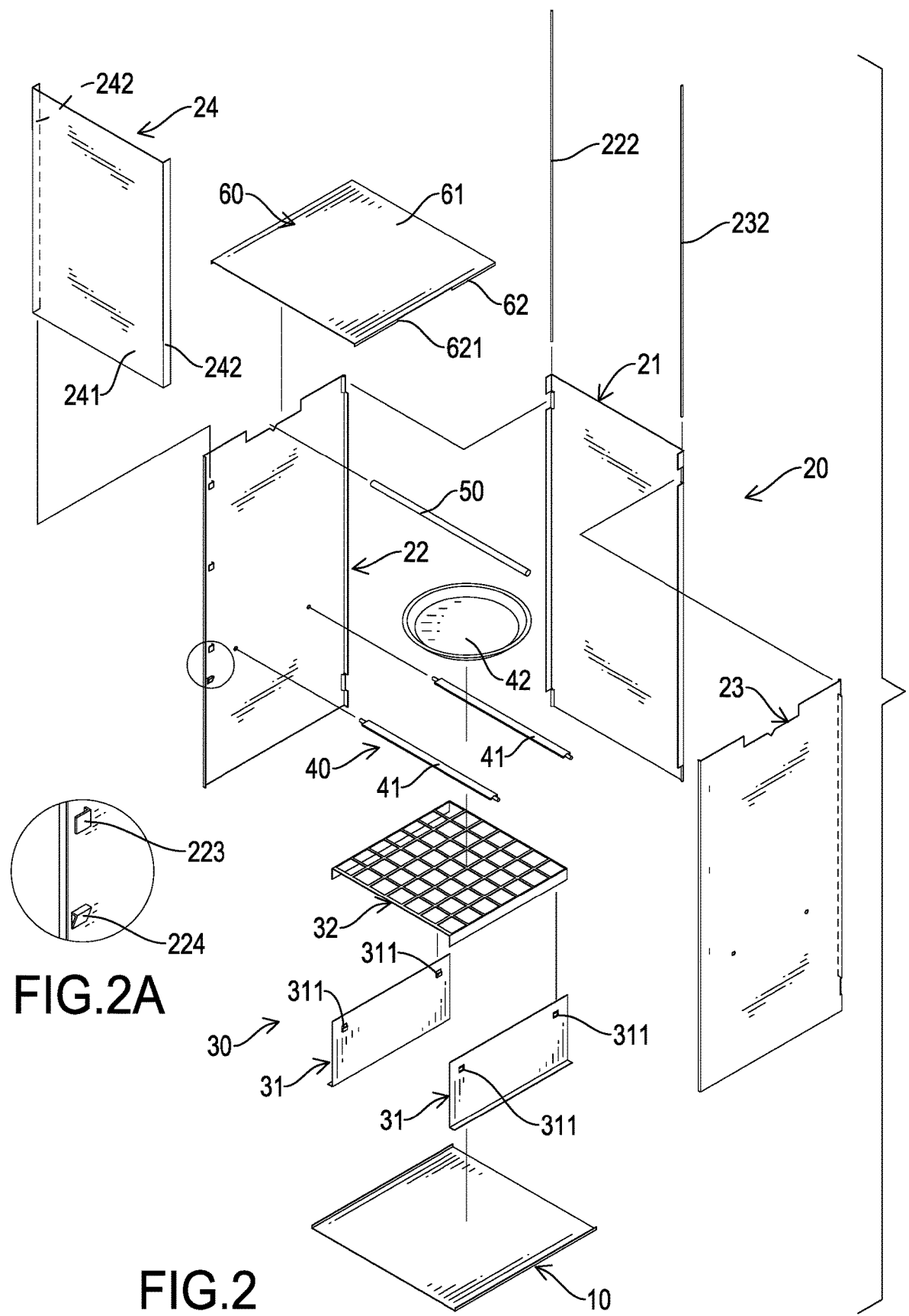

ROASTING DEVICE

BACKGROUND OF THE INVENTION

1. Field of the Invention

The present invention relates to a roasting device, and more particularly, a roasting device that can reduce the volume for storage and can be portable conveniently.

2. Description of Related Art

Now a day people pay much attention to leisure and recreation, outdoor activities such as camping and barbecue are very popular in recent years. Previously registered TW utility model No. M307376, named "multifunctional chicken stove" it mainly discloses a stove that has three jaw-hooks, a pole, and a collection basin. Each one of the three jaw-hooks has an engaging portion.

However, in the above-mentioned patent, the stove is designed in a cylindrical shape and is not foldable. The bulky size of the aforesaid stove is inconvenient for storage and transport. Space for storage is a challenging issue for camping. Although a folding barbecue grill available on the market can solve the problem of storage, however, folding of the barbecue frame is complicated and cannot meet the need of easy storage.

To overcome the shortcomings of the conventional roasting device, the present invention provides a roasting device to solve the aforementioned problems.

SUMMARY OF THE INVENTION

The main objective of the present invention is to provide a roasting device particularly to be portable and easy for storage.

The roasting device has an upright plate unit, a brazier unit and a support unit. The upright plate unit includes a main plate, a first side plate, a second side plate, and a base plate. The main plate has two inner edges. The first side plate is pivotally connected to one of the two inner edges of the main plate. The second side plate is pivotally connected to the other inner edge of the main plate. The base plate is mounted between the first side plate and the second side plate, and abuts the first side plate and the second side plate. The brazier unit is located in the upright plate unit. The support unit is mounted in the upright plate unit and above the brazier unit.

Other objects, advantages, and novel features of the invention will become more apparent in the following detailed descriptions and respective drawings.

BRIEF DESCRIPTION OF THE DRAWINGS

FIG. 1 is a perspective view of a roasting device in accordance with the invention;
FIG. 1A is an enlarged perspective view of the roasting device in FIG. 1;
FIG. 2 is an exploded perspective view of the roasting device in FIG. 1;
FIG. 2A is an enlarged perspective view of the roasting device in FIG. 2.

DETAILED DESCRIPTION OF PREFERRED EMBODIMENT

Figures 3, 3A:
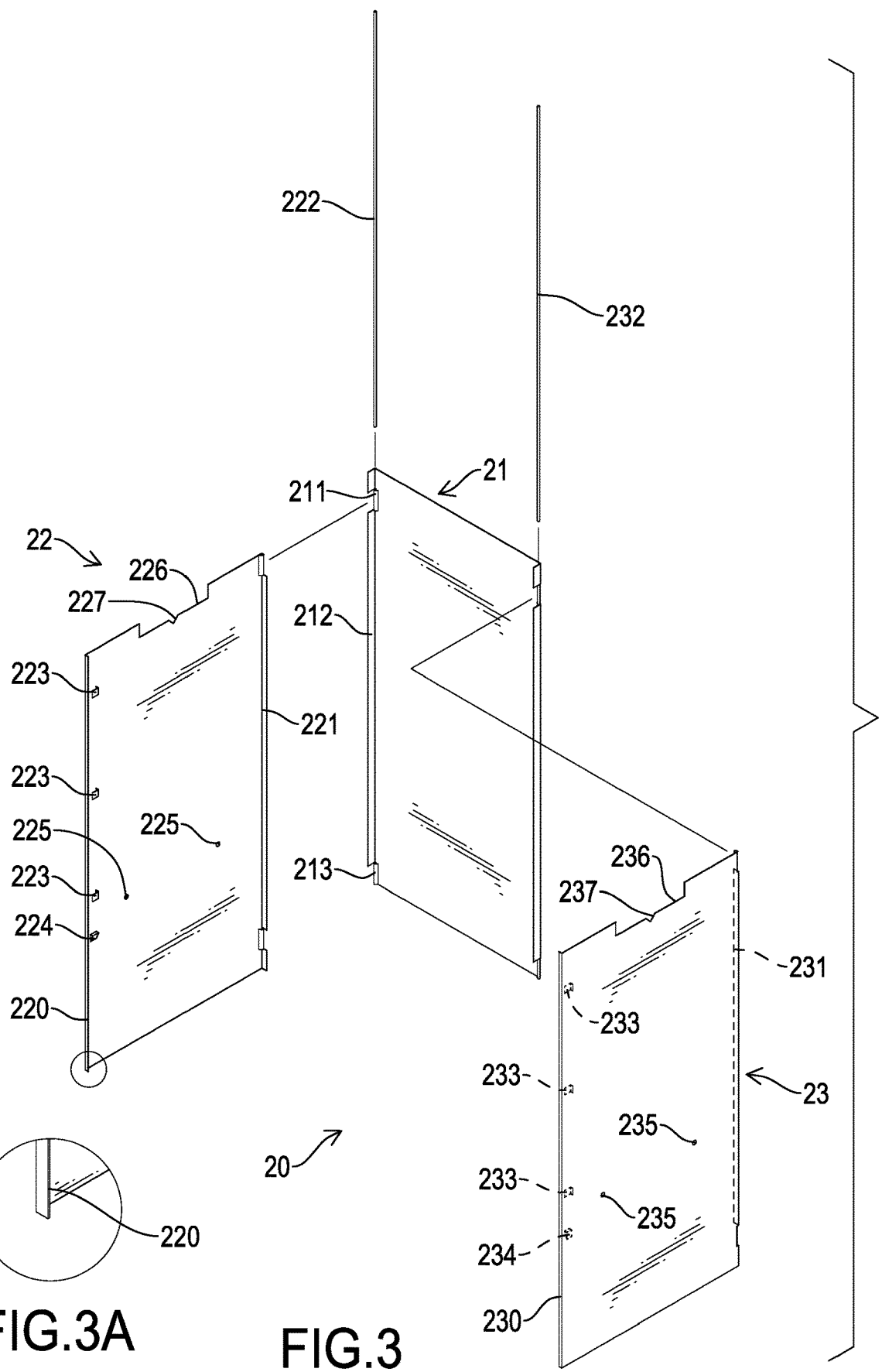
FIG. 3 is another exploded perspective view of the roasting device in FIG. 1.
FIG. 3A is an enlarged perspective view of the roasting device in FIG. 3.
Figure 4:
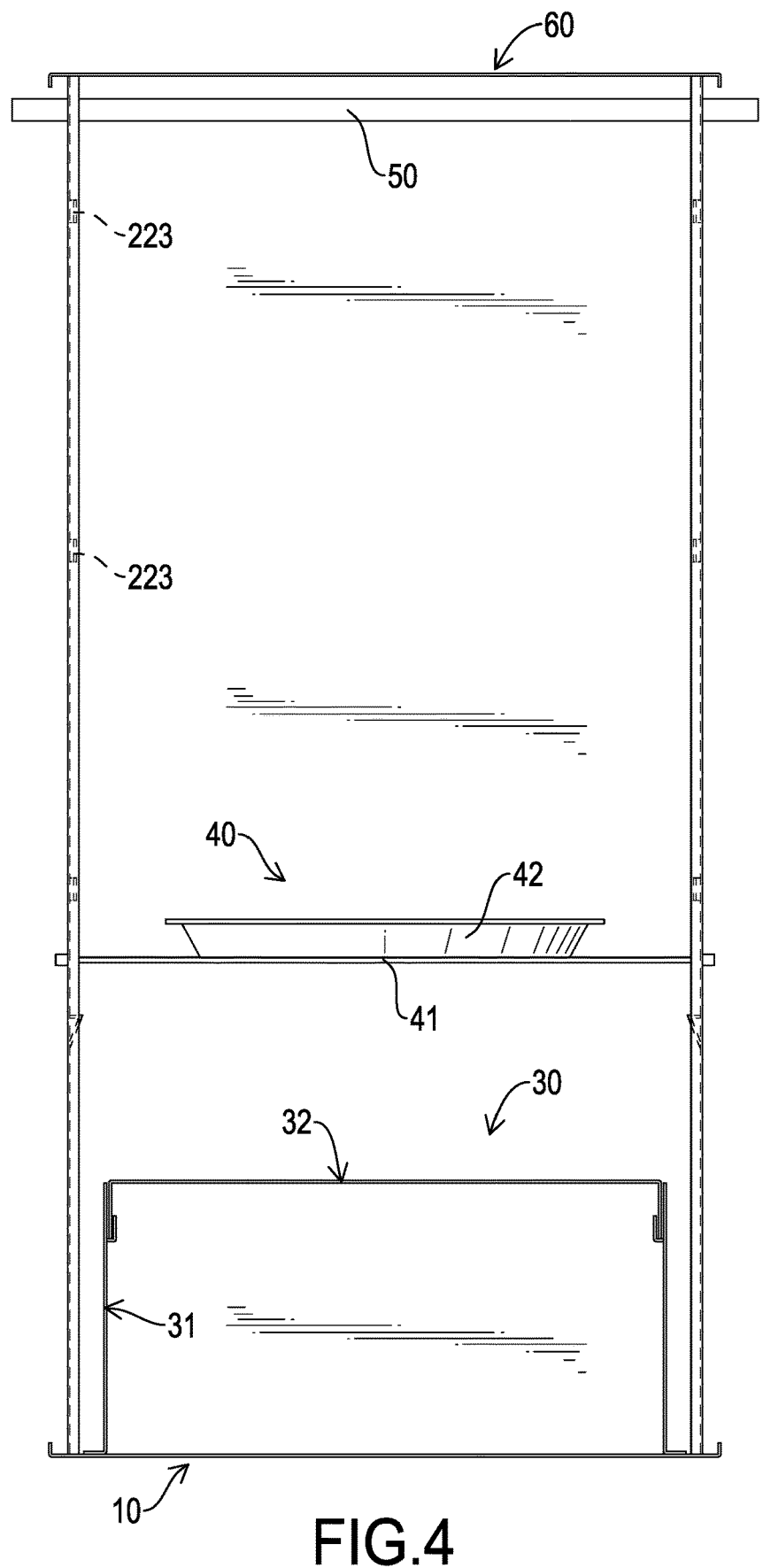
FIG. 4 is a front view of the roasting device in FIG. 1.

With reference to FIGS. 1 to 4, a roasting device in accordance with the present invention comprises a bottom plate 10, an upright plate unit 20, a brazier unit 30, a support unit 40, a hanging rod 50, and a cover board 60.

The bottom plate 10 is a horizontally disposed rectangular plate. The upright plate unit 20 is mounted on a top surface of the bottom plate 10 and includes a main plate 21, a first side plate 22, a second side plate 23, and a base plate 24. The main plate 21 is a vertically disposed rectangular plate and has a first inner edge, a second inner edge, four installation tubes 211, two end plates 212, and four notches 213. Two of the four installation tubes 211 are mounted on the first inner edge of the main plate 21. The other two installation tubes 211 are mounted on the second inner edge of the main plate 21. The two installation tubes 211 arranged on the same inner edge are disposed at a vertical interval. Each end plate 212 is mounted on a respective one of the inner edges of the main plate 21. Each of the two notches 213 is formed through a respective one of the end plates 212 at a spaced interval. For each inner edge of the main plate 21, the positions of the two installation tubes 211 are corresponding to the position of the two notches 213.

The first side plate 22 is pivotally connected to one of the two inner edges of the main plate 21. The first side plate 22 has a top edge, a first inner edge, a second inner edge, two pivoting tubes 221, a pivoting rod 222, three positioning elements 223, a limiting block 224, two through holes 225, a venting hole 226, and a positioning recess 227. The first inner edge of the first side plate 22 is adjacent to the main plate 21, and the second inner edge of the first side plate 22 is distal from the main plate 21. The two pivoting tubes 221 are mounted on the first inner edge of the first side plate 22. The two pivoting tubes 221 are disposed at a vertical interval. The pivoting rod 222 is mounted through the two installation tubes 211 of the main plate 21 and the two pivoting tubes 221 of the first side plate 22. A fin 220 is formed on the second inner edge of the first side plate 22. The three positioning elements 223 are mounted on the second edge of the first side plate 22, and the three positioning elements 223 are disposed at vertical intervals. Each one of the three positioning elements 223 is an L-shaped sheet. The limiting block 224 is mounted on the second inner edge of the first side plate 22 and is located below the three positioning elements 223. The limiting block 224 has a triangular cross section. The two through holes 225 are formed through the first side plate 22 and are located between the first inner edge and the second inner edge of the first side plate. The two through holes 225 are disposed at a horizontally spaced interval. The venting hole 226 is formed in the top edge of the first side plate 22. The positioning recess 227 is formed in a bottom edge of the venting hole 226 of the first side plate 22.

Figure 7:
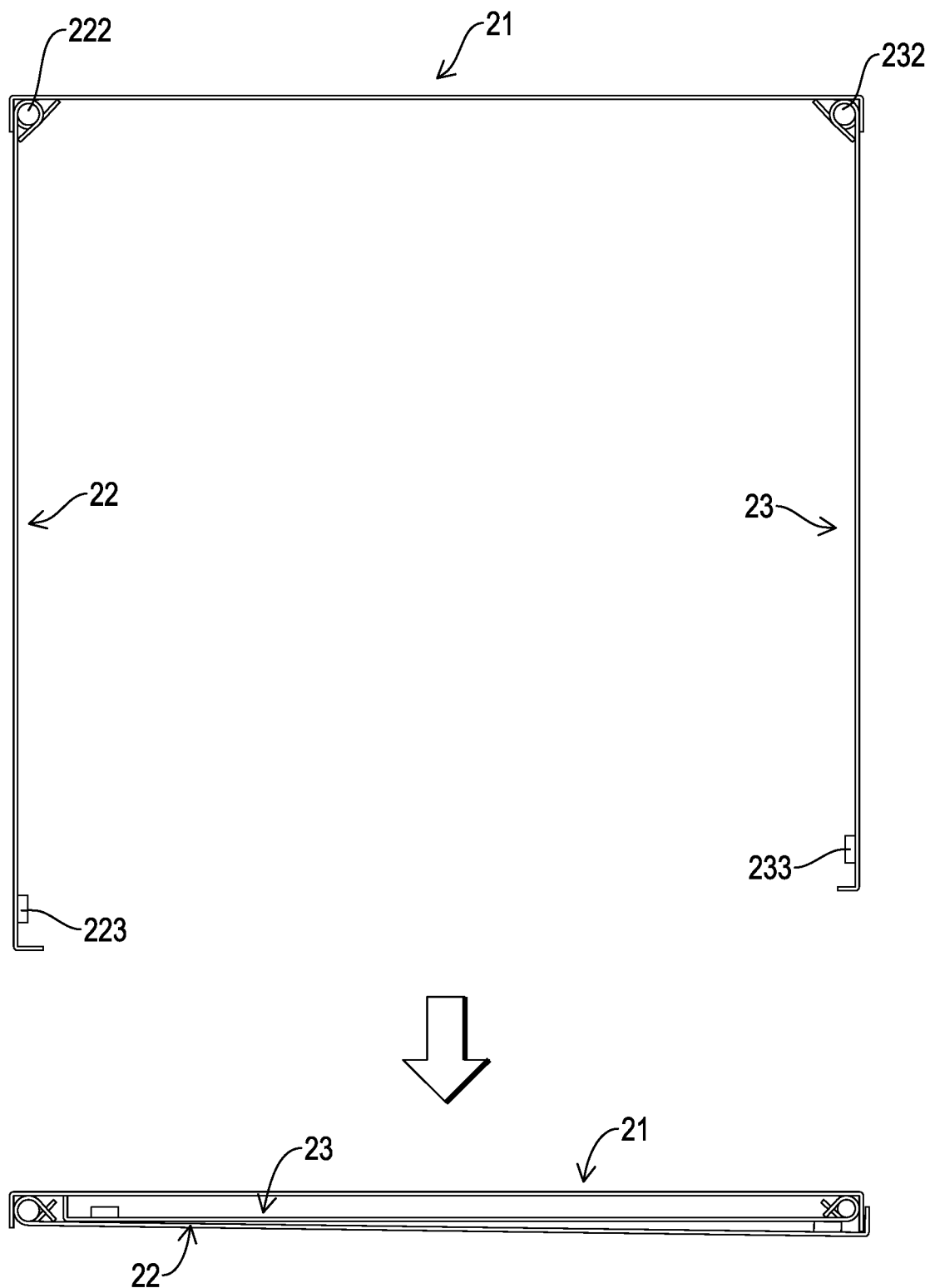
FIG. 7 shows operational top views of the roasting device in FIG. 1.

The second side plate 23 is pivotally connected to the other inner edge of the main plate 21. The second side plate 23 has a top edge, a first inner edge, a second inner edge, two pivoting tubes 231, a pivoting rod 232, three positioning elements 233, a limiting block 234, two through holes 235, a venting hole 236, and a positioning recess 237. The first inner edge of the second side plate 23 is adjacent to the main plate 21, and the second inner edge of the second side plate 23 is distal from the main plate 21. The two pivoting tubes 231 are mounted on the second inner edge of the second side plate 23. The two pivoting tubes 231 are vertically spaced. The pivoting rod 232 is mounted through the two installation tubes 211 of the main plate 21 and the two pivoting tubes 231 of the second side plate 23. A fin 230 is formed on the second inner edge of the second side plate 23. The three positioning elements 233 are mounted on the second inner edge of the second side plate 23, and the three positioning elements 233 are vertically spaced. Each one of the three positioning elements 233 is an L-shaped sheet. The limiting block 234 is mounted on the second inner edge of the second side plate 23 and below the three positioning elements 233. The limiting block 234 is triangular in cross section. The two through holes 235 are formed through the second side plate 23 and between the first and second inner edges of the second side plate 23. The two through holes 235 are spaced at an interval. The venting hole 236 is formed in the top edge of the second side plate 23. The positioning recess 237 is formed in the bottom edge of the venting hole 236 of the second side plate 23. The width of the second side plate 23 is smaller than the width of the main plate 21 so that the first side plate 22 and the second side plate 23 can be folded in the form as shown in FIG. 7 with respect to the main plate 21, and the width of the first side plate 22 is greater than or equal to the width of the main plate 21.

The base plate 24 is mounted between the first side plate 22 and the second side plate 23 and abuts the first side plate 22 and the second side plate 23. The base plate 24 is a U-shaped plate, and has a body 241 and two wing portions 242. The body 241 has two side edges. The two wing portions 242 are respectively formed on the two side edges of the body 241. One of the two wing portions 242 is inserted into and held in a space formed between the fin 220 of the first side plate 22 and the three L-shaped positioning elements 223 of the first side plate 22. The other wing portion 242 is inserted into and held in a space formed between the fin 230 of the second side plate 23 and the three positioning elements 233 of the second side plate 23. The bottom ends of the two wing portions 242 of the base plate 24 abut against the top surface of the limiting block 224 of the first side plate 22 and the top surface of the limiting block 234 of the second side plate 23, forming a connection hole 25 below the base plate 24.

The brazier unit 30 is mounted on the top surface of the bottom plate 10 and is located in the upright plate unit 20. The brazier unit 30 has two upright elements 31 and a carrying element 32. The two upright elements 31 are disposed at a spaced interval. Each one of the upright elements 31 is an L-shaped sheet and has two abutting elements 311. Each one of the abutting elements 311 is an L-shaped sheet. The carrying element 32 is mounted at the abutting elements 311 of the two upright elements 31. The carrying element 32 is a U-shaped reticulated plate.

The support unit 40 is mounted in the upright plate unit 20 and above the brazier unit 30. The support unit 40 has two supporting rods 41 and a drip tray 42. Each supporting rod 41 has two ends respectively mounted through the through hole 225 of the first side plate 22 and the through hole 235 of the second side plate 23, and this makes the two supporting rods 41 located between the first side plate 22 and the second side plate 23. The two supporting rods 41 are above the brazier unit 30. The drip tray 42 is mounted on top surfaces of the two supporting rods 41.

The hanging rod 50 is mounted at the positioning recess 227 of the first side plate 22 and the positioning recess 237 of the second side plate 23. The hanging rod 50 is above the support unit 40.

The cover board 60 is mounted on a top surface of the upright plate unit 20 and is a U-shaped board. The cover board 60 has a main body 61 and two side portions 62. The two side portions 62 are respectively formed on two side edges of the main body 61. Each one of the side portions 62 has a venting recess 621. The venting recess 621 is formed in a bottom edge of the side portion 62. The positions of the two venting recesses 621 correspond respectively to the positions of the venting hole 226 of the first side plate 22 and the venting hole 236 of the second side plate 23.

Figure 5:
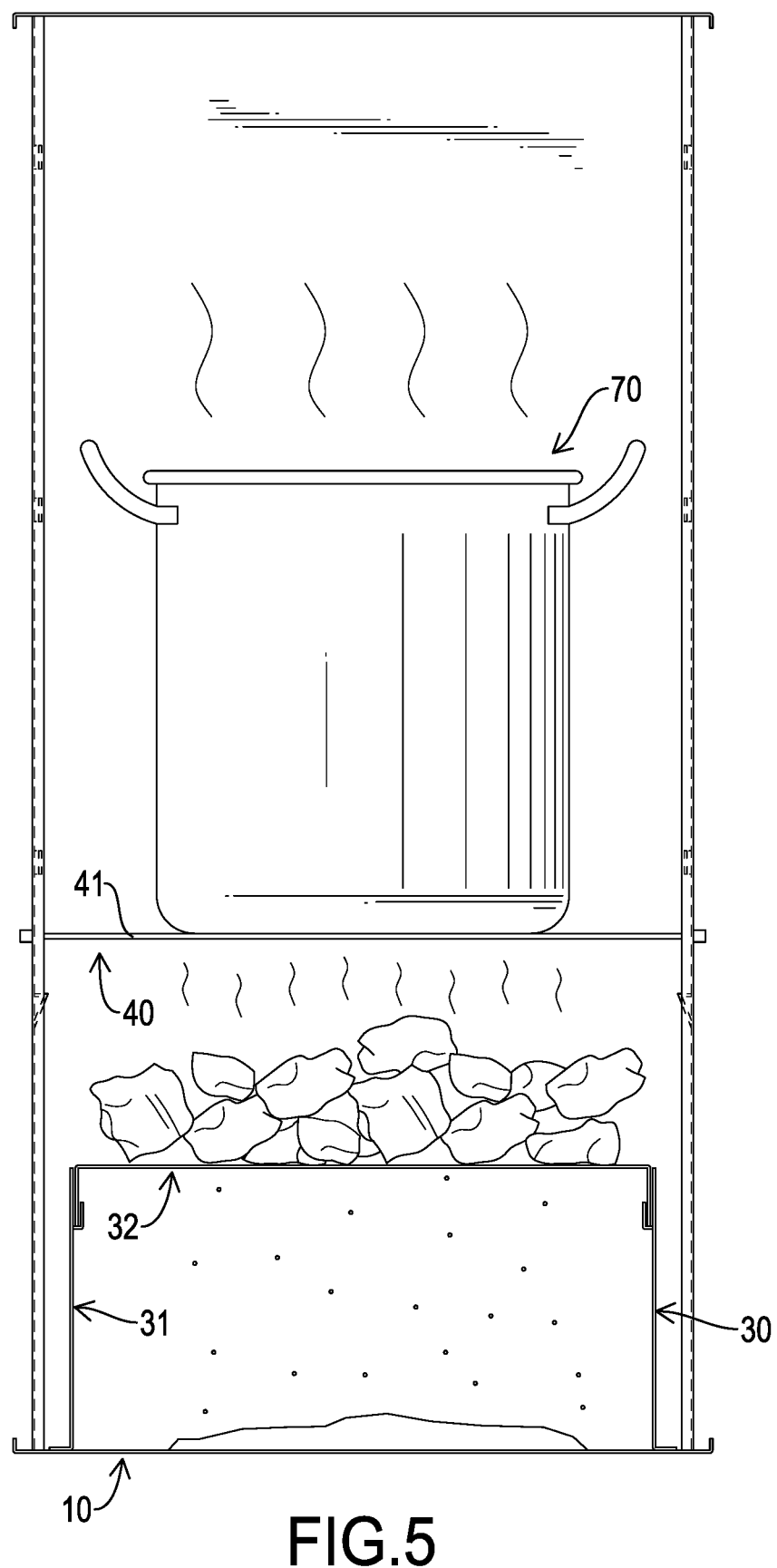
FIG. 5 is an operational front view of the roasting device in FIG. 1.
Figure 6:
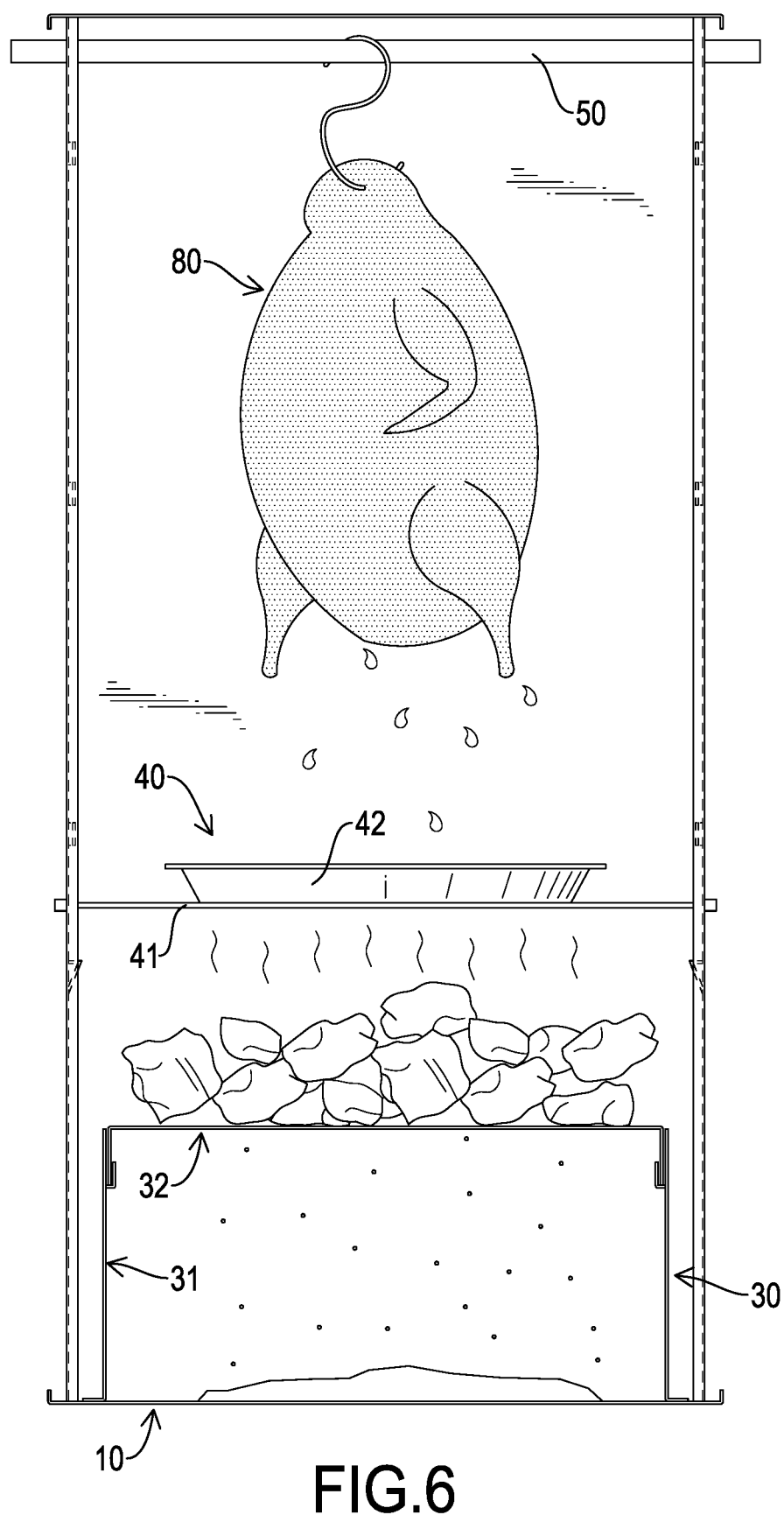
FIG. 6 is another operational front view of the roasting device in FIG. 1.

With reference to FIGS. 2, 3, and 5, when the roasting device in accordance with the present invention is in use, the charcoal is placed on the top surface of the carrying element 32 of the brazier unit 30. The base plate 24 is detached from the upright plate unit 20, and then a pot 70 is placed on the top of the two supporting rods 41 of the support unit 40. The present invention can be used to heat the pot 70 for cooking food. Further as shown in FIGS. 2, 3, and 6, a food ingredient 80 (e.g., chicken, duck or fish) may be placed on the hanging rod 50 and the drip tray 42 may be placed on the tops of the two support rods 41. Further, since the two venting recesses 621 correspond to the venting holes 226 of the first side plate 22 and the venting holes 236 of the second side plate 23 in position, smoke can scatter via the venting holes 226 of the first side plate 22 and the venting holes 236 of the second side plate 23.

In addition, since the first side plate 22 and the second side plate 23 are pivotally connected to the main plate 21 respectively, when the roasting device in accordance with the present invention is not in use, the base plate 24 can be detached from the first side plate 22 and the second side plate 23, and the first side plate 22 and the second side plate 23 are respectively pivoted with respect to the main plate 21. In this way, the storage volume of the present invention is minimized, and the present invention is easy to carry around. And this roasting device is plug-free and portable Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A roasting device comprising:
an upright plate unit comprising a main plate having a first inner edge and a second inner edge;
a first side plate pivotally connected to the first inner edge of the main plate that has a first inner edge, a second inner edge, a fin formed on the second inner edge of the first side plate, at least one positioning element mounted on the second inner edge of the first side plate and a limiting block mounted on the second inner edge of the first side plate and below the at least one positioning element;
a second side plate pivotally connected to the second inner edge of the main plate that has a first inner edge, a second inner edge, a fin formed on the second inner edge of the second side plate, at least one positioning element mounted on the second inner edge of the second side plate and a limiting block mounted on the second inner edge of the second side plate and below the at least one positioning element of the second side plate;

a base plate mounted between the first side plate and the second side plate, that abuts the first side plate and the second side plate, and has a body comprising two side edges;

two wing portions respectively formed on the two side edges of the body, one of the two wing portions inserted into and held in a space formed between the fin of the first side plate and the at least one positioning element of the first side plate, the other wing portion inserted into and held in a space formed between the fin of the second side plate and the at least one positioning element of the second side plate, bottom ends of the two wing portions of the base plate respectively abutting against a top surface of the limiting block of the first side plate and a top surface of the limiting block of the second side plate, and a connection hole formed below the base plate;

a brazier unit mounted in the upright plate unit; and a support unit mounted in the upright plate unit and above the brazier unit that has two supporting rods mounted through the first side plate and the second side plate which are located between the first side plate and the second side plate and are positioned above the brazier unit.

2. The roasting device as claimed in claim 1, wherein the first side plate has a venting hole formed in a top edge of the first side plate and a positioning recess formed in a bottom edge of the venting hole of the first side plate, and the second side plate has a venting hole formed in a top edge of the second side plate and a positioning recess formed in a bottom edge of the venting hole of the second side plate.

3. The roasting device as claimed in claim 1, wherein the support unit further has a drip tray mounted on top surfaces of the two supporting rods.

4. The roasting device as claimed in claim 2, wherein the roasting device further has a hanging rod mounted at the positioning recess of the first side plate and the positioning recess of the second side plate and above the support unit.

5. The roasting device as claimed in claim 1, wherein the first side plate has two through holes formed through the first side plate, the second side plate has two through holes formed through the second side plate, and each supporting rod has two ends respectively mounted through one of the through holes of the first side plate and a corresponding one of the through holes of the second side plate.

6. The roasting device as claimed in claim 2, wherein the roasting device further has a cover board mounted on a top surface of the upright plate unit.

7. The roasting device as claimed in claim 6, wherein the cover board is a U-shaped board, the cover board has a main body and two side portions, the two side portions are respectively formed on two side edges of the main body, each one of the side portions has a venting recess formed in a bottom edge of the side portion, and each of the two venting recesses is positioned to align with either the venting hole of the first side plate or the venting hole of the second side plate.

8. The roasting device as claimed in claim 1, wherein the roasting device further has a bottom board, the bottom board is a horizontally disposed rectangular plate, the upright plate unit is mounted on a top surface of the bottom board, and the brazier unit is mounted on the top surface of the bottom board.

9. The roasting device as claimed in claim 1, wherein the brazier unit has two upright elements and a carrying element, the two upright elements are disposed at a spaced interval, each one of the upright elements is an L-shaped sheet and has two abutting elements, and the carrying element is mounted at the abutting elements of the two upright elements.

10. The roasting device as claimed in claim 1, wherein a width of the second side plate is smaller than a width of the main plate, and a width of the first side plate is greater than or equal to the width of the main plate.

11. The roasting device as claimed in claim 2, wherein a width of the second side plate is smaller than a width of the main plate, and a width of the first side plate is greater than or equal to the width of the main plate.

12. The roasting device as claimed in claim 3, wherein a width of the second side plate is smaller than a width of the main plate, and a width of the first side plate is greater than or equal to the width of the main plate.

13. The roasting device as claimed in claim 4, wherein a width of the second side plate is smaller than a width of the main plate, and a width of the first side plate is greater than or equal to the width of the main plate.

14. The roasting device as claimed in claim 5, wherein a width of the second side plate is smaller than a width of the main plate, and a width of the first side plate is greater than or equal to the width of the main plate.

15. The roasting device as claimed in claim 6, wherein a width of the second side plate is smaller than a width of the main plate, and a width of the first side plate is greater than or equal to the width of the main plate.

16. The roasting device as claimed in claim 7, wherein a width of the second side plate is smaller than a width of the main plate, and a width of the first side plate is greater than or equal to the width of the main plate.

17. The roasting device as claimed in claim 8, wherein a width of the second side plate is smaller than a width of the main plate, and a width of the first side plate is greater than or equal to the width of the main plate.

18. The roasting device as claimed in claim 9, wherein a width of the second side plate is smaller than a width of the main plate, and a width of the first side plate is greater than or equal to the width of the main plate.

* * * * *